(12) United States Patent
Lu et al.

(10) Patent No.: US 12,309,478 B2
(45) Date of Patent: May 20, 2025

(54) SELF-ILLUMINATING CAMERA

(71) Applicant: OmniVision Technologies, Inc., Santa Clara, CA (US)

(72) Inventors: I-Lung Lu, New Taipei (TW); Jau-Jan Deng, Taipei (TW); Wei-Ping Chen, New Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 269 days.

(21) Appl. No.: 18/095,401

(22) Filed: Jan. 10, 2023

(65) Prior Publication Data

US 2024/0236465 A1 Jul. 11, 2024

(51) Int. Cl.
*H04N 23/56* (2023.01)
*H04N 23/55* (2023.01)

(52) U.S. Cl.
CPC .............. *H04N 23/56* (2023.01); *H04N 23/55* (2023.01)

(58) Field of Classification Search
CPC ........ H04N 23/56; H04N 23/55; G03B 15/03; A61B 1/00096; A61B 1/00097; A61B 1/00174; A61B 1/05; A61B 1/0676; G02B 23/2461; G02B 23/2484
See application file for complete search history.

(56) References Cited

U.S. PATENT DOCUMENTS

| | | |
|---|---|---|
| 2009/0159200 A1 | 6/2009 | Rossi et al. |
| 2012/0031977 A1 | 2/2012 | Havens et al. |
| 2013/0083200 A1* | 4/2013 | Saito ............. G02B 13/18 359/356 |
| 2017/0030549 A1* | 2/2017 | Kamada ............ G02B 3/0062 |
| 2018/0048811 A1* | 2/2018 | Waller ............ G01B 11/2513 |
| 2018/0081163 A1 | 3/2018 | Lin et al. |
| 2021/0307608 A1* | 10/2021 | Hu .................... A61B 3/14 |

* cited by examiner

*Primary Examiner* — Yogesh K Aggarwal
(74) *Attorney, Agent, or Firm* — COZEN O'CONNOR

(57) ABSTRACT

A self-illuminating camera includes a camera and an illuminator. The camera includes an image sensor and a first lens of a pair of two identical lenses. The illuminator is adjacent to the camera and includes a light source and a second lens of the pair of two identical lenses. The illuminator has a field of illumination that at least partially overlaps a field of view of the camera.

17 Claims, 4 Drawing Sheets

SELF-ILLUMINATING CAMERA

BACKGROUND

Applications such as medical endoscopy require compact packaging of a light source and a camera for illuminating an object and capturing an image of the illuminated object. Such compact packaging is ideally achieved with via a low-cost process that compatible with high-volume manufacturing.

SUMMARY OF THE EMBODIMENTS

In a first aspect, a self-illuminating camera includes a camera and an illuminator. The camera includes an image sensor and a first lens of a pair of two identical lenses. The illuminator is adjacent to the camera and includes a light source and a second lens of the pair of two identical lenses. The illuminator has a field of illumination that at least partially overlaps a field of view of the camera.

DETAILED DESCRIPTION OF THE EMBODIMENTS

Figures herein depict orthogonal axes A1, A2, and A3, also referred to as the x axis, y axis, and z axis, respectively. Herein, the x-y plane is formed by orthogonal axes A1 and A2, and planes parallel to the x-y plane are referred to as transverse planes. Unless otherwise specified, heights and depths of objects herein refer to the object's extent along axis A3. Also, herein, a horizontal plane is parallel to the x-y plane, a width refers to an object's extent along the x or y axis respectively, and a vertical direction is along the z axis.

Figure 1:
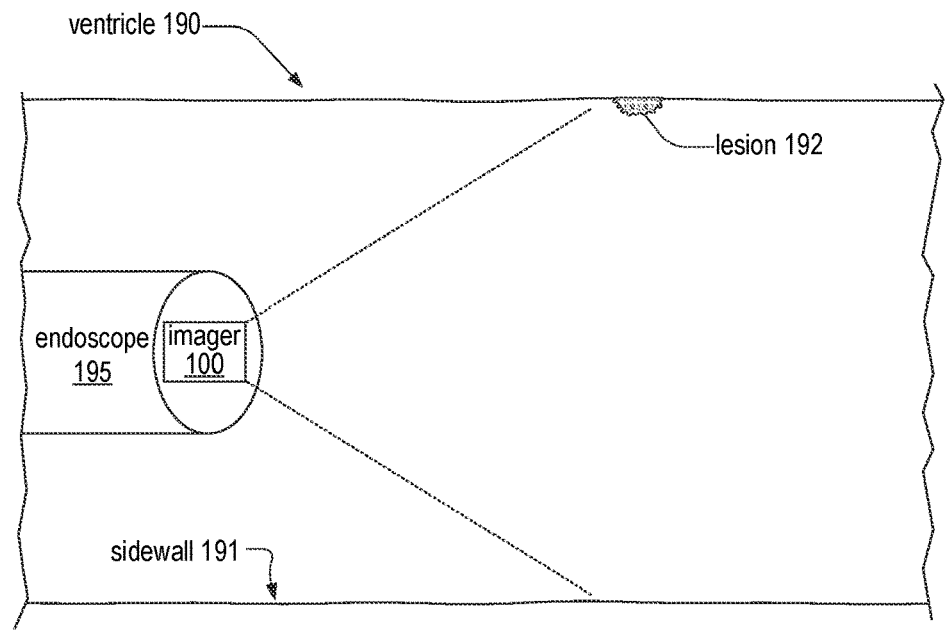
FIG. 1 is a cross-sectional view of a ventricle that includes a lesion imaged by a self-illuminating camera of an endoscope, in an embodiment.

FIG. 1 is a cross-sectional view of an endoscope 195 inside a ventricle 190 that includes a lesion 192. Lesion 192 is on a ventricle sidewall 191. Ventricle 190 may be, for example, a portion of an esophagus or an intestine. Endoscope 195 includes a self-illuminating camera 100, which both illuminates and images lesion 192.

Figure 2:
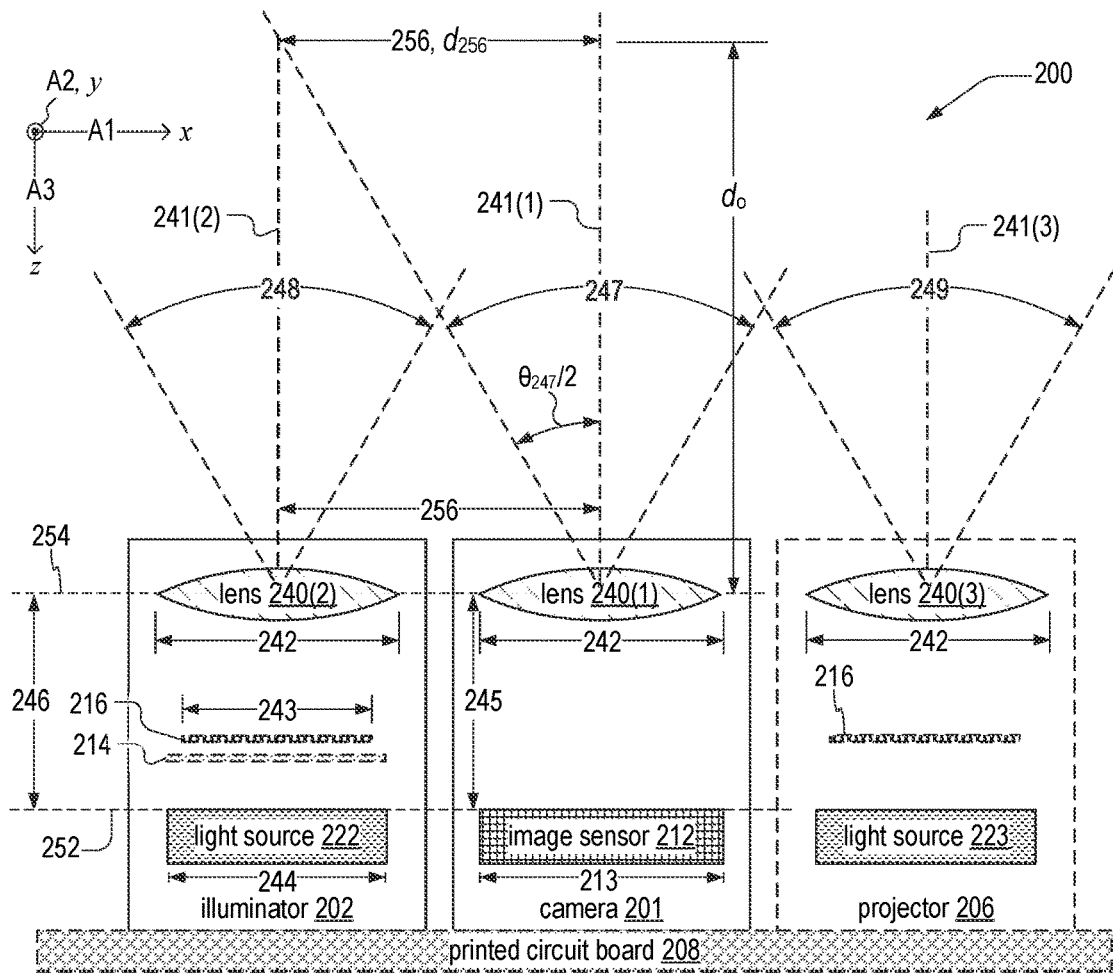
FIG. 2 is a cross-sectional schematic of a self-illuminating camera, which is an example of the self-illuminating camera of FIG. 1, in an embodiment.

FIG. 2 is a cross-sectional schematic of a self-illuminating camera 200, which is an example of self-illuminating camera 100. The cross-sectional plane of FIG. 2 is parallel to the x-y plane. Self-illuminating camera 200 includes a camera 201 and an illuminator 202. Camera 201 includes an image sensor 212 and a lens 240(1). Illuminator 202 is adjacent to camera 201, and including a light source 222 and a lens 240(2). Lenses 240(1) and 240(2) are identical, e.g., in at least the following properties: material, refractive index, width 242, surface profile, and focal length. Light source 222 may be, or include, a light emitting diode. Self-illuminating camera 200 may include a shutter located at an aperture stop of at least one of camera 201 and illuminator 202.

Lenses 240(1) and 240(2) have respective optical axes 241(1) and 241(2), which may be parallel. Optical axes 241(1) and 241(2) intersect image sensor 212 and light source 222, respectively. FIG. 2 depicts a horizontal plane 254, which intersects each of lenses 240(1) and 240(2) and is perpendicular to at least of optical axis 241. Horizontal plane 254 may be coplanar with a principal plane of at least one of lenses 240(1-3). Respective centers of lenses 240(1) and 240(2) are separated by a center-to-center distance 256. Distance 256 may be in horizontal plane 254 and may be a distance between respective optical centers of lenses 240(1) and 240(2).

Camera 201 has a field of view 247. Illuminator 202 has a field of illumination 248 that at least partially overlaps field of view 247 such that objects imaged by camera 201, e.g., lesion 192, are adequately illuminated. The extent of field of illumination 248 may be defined by the angle at which the intensity of light emitted by illuminator 202 is a fraction of its peak on-axis value. Examples of the fraction include one-half, $1/e$, and $1/e^2$, where e is Euler's number.

Field of view 247 may be a diagonal field of view, and may exceed 120 degrees. Lens 240(1) is at a height 245 above a light-sensing surface of image sensor 212. The light-sensing surface is in a plane 252. Lens 240(2) is at a height 246 above plane 252. Heights 245 and 246 may be substantially equal. For example, a difference between the height 245 and height 246 may be less than a depth of focus of lens 240(1).

Field of view 247 may be defined by height 245, and a width 213 of image sensor 212 along axis A1. Image sensor 212 has a pixel array. Width 213 may be a "landscape width" of the image sensor, which is parallel to the rows of the pixel array, a "portrait width" of the image sensor, which is parallel to the columns of the pixel array, or a diagonal width. Height 245 may be distance from the image sensor to a principal plane of lens 240(1). In a simple lens approximation, field of view 247 equals $2 \arctan(w_{213}/(2h_{245}))$, where $w_{213}$ and $h_{245}$ denote width 213 and height 245, respectively.

FIG. 2 denotes distance 256 as $d_{256}$, field of view 247 as $\theta_{247}$, and an object distance $d_0$. As illustrated by the geometry of FIG. 2, this particular object distance $d_0$ equals $d_{256}/\tan(\theta_{247}/2)$, and corresponds to when an edge of field of view 247 intersects optical axis 241(2). At this object distance, and in the x-z plane, the fraction of field of view 247 overlapped by field of illumination 248 is one-half. As distance 256 decreases, the overlap of field of view 247 and field of illumination increases for a given object distance. Since higher values of this fraction are beneficial for producing quality images, the relationship between distance 256, field of view 247, and object distance $d_0$ suggests an upper limit for distance 256: $d_{256} \leq d_0 \tan(\theta_{247}/2)$. Using the expression for field of view 247 based on the above-mentioned simple lens approximation, an upper limit of distance 256 may be expressed as $d_{256} \leq 0.5 d_0 w_{213}/h_{245}$.

Per the thin lens approximation, object distance $d_0$ may be expressed as a function of the focal length $f$ of lens 240(1) and an image distance equal to height 245: $d_0 = f h_{245}/(h_{245} - f)$. Hence, in embodiments, distance 256 is less than or equal to $0.5 f w_{213}/(h_{245} - f)$. A similar upper limit on distance 256 is based on ensuring that camera 202 captures a real image, which requires object distance $d_0$ is greater than $f$. Hence, in embodiments, distance 256 is less than $0.5 f w_{213}/h_{245}$.

Between light source 222 and lens 240(2), illuminator 202 may include at least one of an optical diffuser 214 and an amplitude mask 216. Optical diffuser 214 increases uniformity of illumination across field of illumination 248, and may be a batwing diffuser. With amplitude mask 216, illuminator 202 projects structured illumination on lesion 192, which enables processing of images captured by camera 201 to yield a depth map of lesion 192.

In embodiments, light source 222 has a light-emission area that exceeds a mask-area of amplitude mask 216. Each of the light-emission area and the mask-area are in respective transverse planes. For example, amplitude mask 216 and light source 222 and have respective widths 243 and 244, where width 244 exceeds width 243. In such embodiments, a central region of field of illumination 248 includes structured illumination that enables depth map construction, while a surrounding edge region includes unstructured illumination that improves image quality.

In embodiments, self-illuminating camera 200 may include a projector 206, which is an example of illuminator 202 that includes a lens 240(3), a light source 223, and amplitude mask 216. Projector 206 may also include optical diffuser 214 between amplitude mask 216 and light source 223. In the example of FIG. 2, projector 206 is adjacent to camera 201. When self-illuminating camera 200 includes projector 206, illuminator 202 may lack amplitude mask 216, such that illuminator 202 does not project a pattern, while projector 206 does.

Lens 240(3) has an optical axis 241(3), and may be identical to each of lenses 240(1) and 240(2). Optical axis 241(3) intersects light source 223. Light source 223 has a field of illumination 249 that at least partially overlaps field of view 247. When light source 223 is identical to light source 222, field of illumination 249 equals field of illumination 248. Light source 223 may differ from light source 222, e.g., by having a different emission spectrum.

Camera 201, illuminator 202, and projector 206 may be arranged linearly, as shown in FIG. 2. Alternatively, camera 201, illuminator 202, and projector 206 may be arranged such that respective optical centers of lenses 240 form a triangle, such as an isosceles or equilateral triangle, in horizontal plane 254. In embodiments, respective optical centers of lenses 240(1-3) are equidistant from each other, such that the optical centers define an equilateral triangle. In such embodiments, each of field of illumination 248, field of illumination 249, and field of view 247 may overlap.

Self-illuminating camera 200 may include a printed circuit board 208 electrically connected to each of image sensor 212 and light source 222. When self-illuminating camera 200 includes projector 206, light source 223 may be electrically connected to printed circuit board 208. At least one camera 201, illuminator 202, and projector 206 may be attached to printed circuit board 208.

Figure 3:
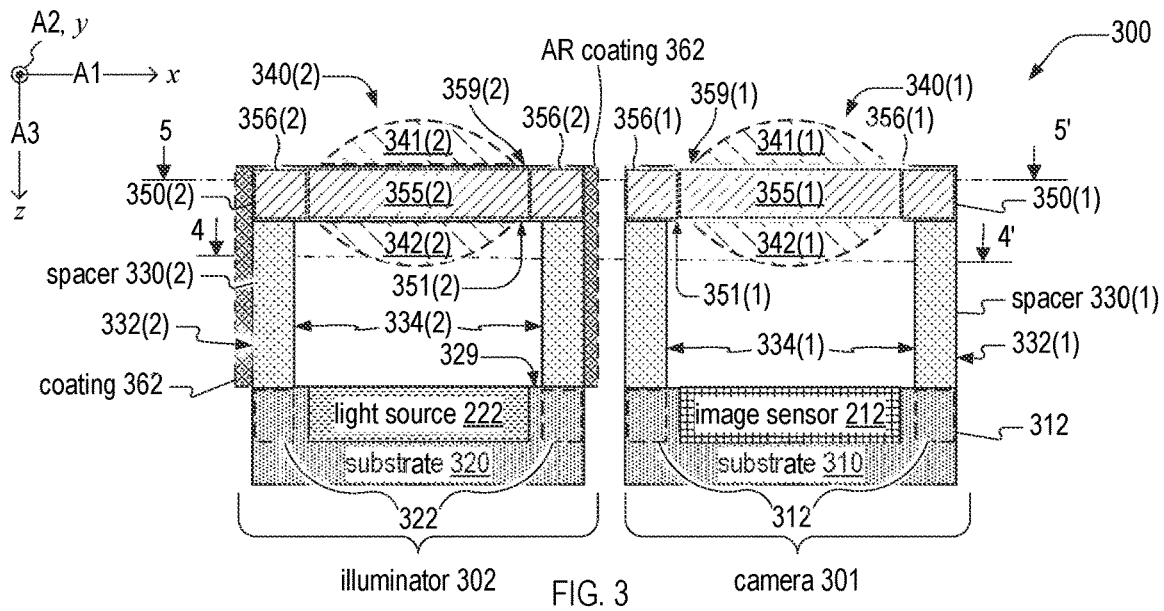
FIGS. 3-5 are respective cross-sectional schematics of a first self-illuminating camera, which is embodiment of the self-illuminating camera of FIG. 2.
Figure 4:
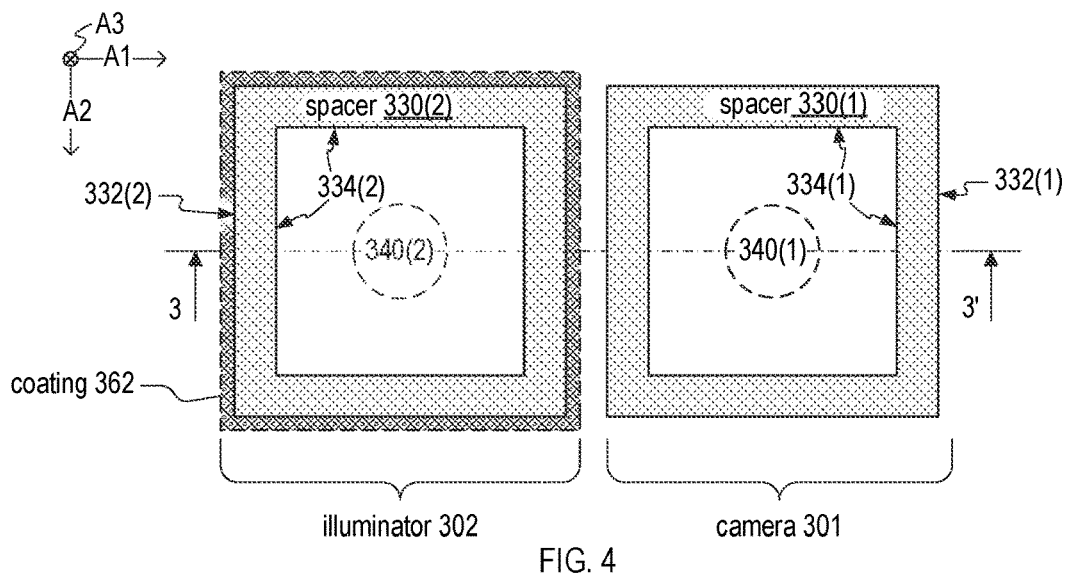
Figure 5:
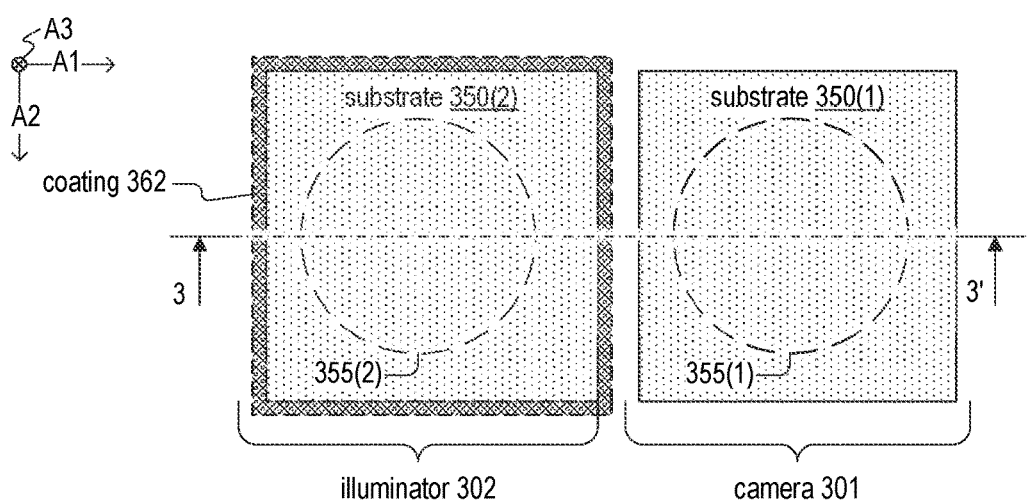

FIGS. 3-5 are respective cross-sectional schematics of a self-illuminating camera 300, which is an example of self-illuminating camera 200. FIG. 3 denotes transverse planes 4-4', and 5-5', which are the cross-sectional planes of FIGS. 4 and 5, respectively. FIGS. 4 and 5 denote a longitudinal plane 3-3', which is the cross-sectional plane of FIG. 3. FIGS. 3-5 are best viewed together in the following description.

Self-illuminating camera 300 includes a camera 301 and an illuminator 302, which are respective examples of camera 201 and illuminator 202. Camera 301 includes at least one of a semiconductor substrate 310, a substrate 350(1), and a lens 340(1). Lens 340(1) includes at least one of lenses 341(1) and 342(1). Semiconductor substrate 310 includes image sensor 212.

Illuminator 302 includes at least one of a semiconductor substrate 320, a substrate 350(2), and a lens 340(2). Lens 340(2) includes at least one of lenses 341(2) and 342(2). Semiconductor substrate 320 includes light source 222. Illuminator 302 may include at least one of optical diffuser 214 and amplitude mask 216 between light source 222 and substrate 350(2). One or both of optical diffuser 214 and amplitude mask 216 may be on, and/or supported by, a top surface 329 of semiconductor substrate 320.

Substrates 350(1,2) may be transparent, e.g., to a specific range electromagnetic wavelengths such as ultraviolet, visible, and near-IR. Substrates 350(1,2) have respective bottom surface regions 351(1,2) and top surface regions 359(1,2), each of which may be planar. Lenses 341(1,2) are on top surfaces regions 359(1,2), respectively. Lenses 342(1,2) are on bottom surfaces regions 351(1,2), respectively. At least part of each lenses 341(1,2) is on respective lens-supporting region 355(1) and 355(2), respectively.

Substrates 350(1) and 350(2) may be monolithic, e.g., integrally formed, such that they are respective regions of a common substrate. In embodiments, at least one of (a) lens 340(1) and substrate 350(1) is monolithic, and (b) lens 340(2) and substrate 350(2) is monolithic.

Substrates 350(1,2) have respective lens-supporting region 355(1,2) and a respective periphery regions 356(1,2). Lens-supporting regions 355(1,2) are directly above image sensor 212 and light source 222, respectively. Periphery regions 356(1,2) surround lens-supporting regions 355(1,2), respectively.

Lenses 340(1) and 340(2) are examples of lenses 240(1) and 240(2), respectively. Each of (a) lenses 341(1) and 341(2) are identical and (b) lenses 342(1) and 342(2) are identical in the same sense that lenses 240 are identical. When lenses 340 includes both lenses 341 and lenses 342, (a) the compound lens that includes lens 341(1), substrate 350(1), and lens 342(1) is an example of lens 240(1), and (b) the compound lens that includes lens 341(2), substrate 350(2), and lens 342(2) is an example of lens 240(2).

Self-illuminating camera 300 includes apertured spacers 330(1) and 330(2). Semiconductor substrate 310 includes a periphery region 312 that surrounds a pixel array of image sensor 212. Semiconductor substrate 320 includes a periphery region 322 that surrounds light source 222. Periphery regions 356(1,2) are directly above periphery regions 312 and 322, respectively. Apertured spacer 330(1) spans between the periphery region 312 and a periphery region 356(1). Apertured spacer 330(2) spans between the periphery region 322 and a periphery region 356(2).

Apertured spacers 330(1,2) have respective interior surfaces 334(1,2), which define respective apertures through apertured spacers 330. FIG. 4 illustrates interior surfaces 334 as being rectangular in a horizontal cross-section. This cross-sectional shape may be other than rectangular, e.g., circular or polygonal, without departing from the scope hereof.

Apertured spacers 330 have respective exterior surfaces 332(1,2). In embodiments, illuminator 302 includes a coating 362 on exterior surface 332(2). Coating 362 may extend to cover exterior surfaces of substrate 350(2), as shown in FIGS. 3 and 5. Within an emission spectrum of light source 222, coating 362 may function as either a reflective coating or an anti-reflective coating, such as an absorptive coating. As a reflective coating, coating 362 increases luminance of illuminator 302 and may enable field of illumination 248 to be equal to or greater than field of view 247. When illuminator 202 includes amplitude mask 216 and coating 362 is an anti-reflective coating, coating 362 increases the sharpness of the image of amplitude mask 216 captured by camera 201.

Figure 6:
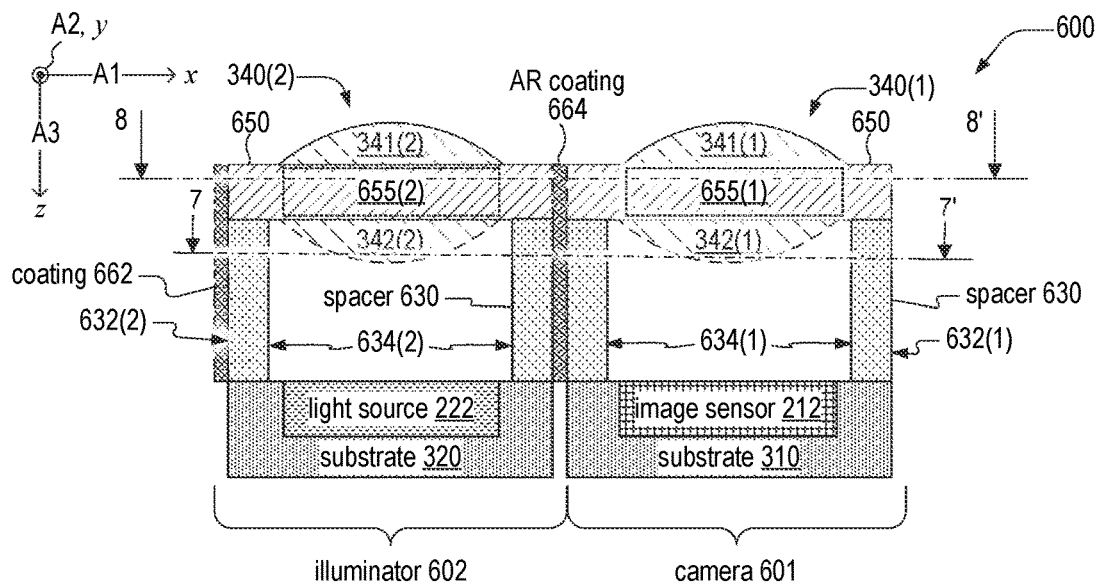
FIGS. 6-8 are respective cross-sectional schematics of a second self-illuminating camera, which is embodiment of the self-illuminating camera of FIG. 2.
Figure 7:
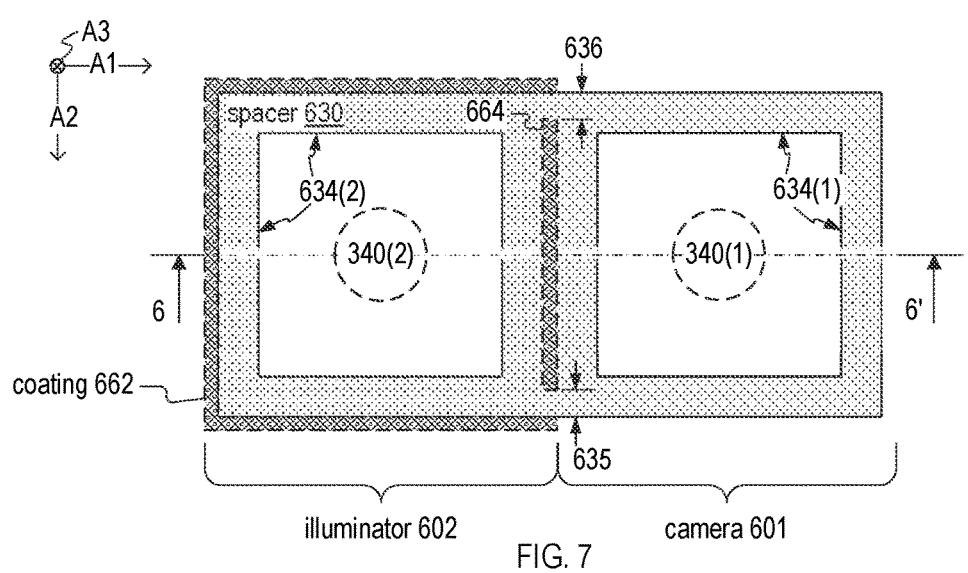
Figure 8:
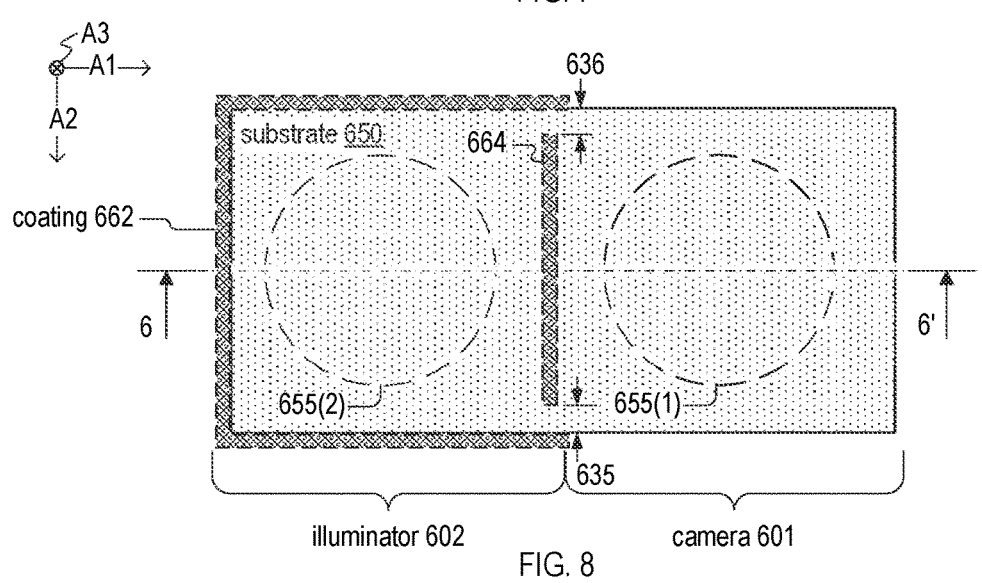

In embodiments, at least one of (a) substrates 350(1) and 350(2) are respective regions of a single common substrate, and (b) apertured spacers 330(1) and 330(2) are respective regions of a single common spacer. For example, FIGS. 6-8 are respective cross-sectional schematics of a self-illuminating camera 600, which is an example of self-illuminating camera 300 where at least one of (a) a multi-apertured spacer 630 replaces, and is an example of, each of spacers 330(1) and 330(2), and (b) a substrate 650 replaces, and is an example of, each of substrates 350(1) and 350(2). Self-illuminating camera 600 includes camera 601 and illuminator 602, which are respective examples of camera 301 and illuminator 302. In embodiments, lens 340(1), 340(2), and substrate 650 are monolithic, e.g., integrally formed.

FIG. 6 denotes transverse planes 7-7', and 8-8', which are the cross-sectional planes of FIGS. 7 and 8, respectively. FIGS. 7 and 8 denote a longitudinal plane 6-6', which is the cross-sectional plane of FIG. 6.

Multi-apertured spacer 630 includes exterior surfaces 632 and interior surfaces 634, which are respective examples of exterior surfaces 632 and interior surfaces 334. Self-illuminating camera 600 may include a coating 662, which is an example of coating 362, and a coating 664. Coating 664 is at least partially embedded within multi-apertured spacer 630 between respective apertures formed by interior surfaces 634, as shown in FIG. 6.

Substrate 650 includes regions 655(1) and 655(2), which are examples of regions 355(1) and 355(2). Coating 664 may also be at least partially embedded within substrate 650, between regions 655(1) and 655(2), as shown in FIG. 8. FIGS. 7 and 8 illustrates thicknesses 635 and 636 of substrate 650 between coating 662 and coating 664. In embodiments, at least one of thicknesses 635 and 636 may equal zero, such that coatings 662 and 664 are continuous.

Figure 9:
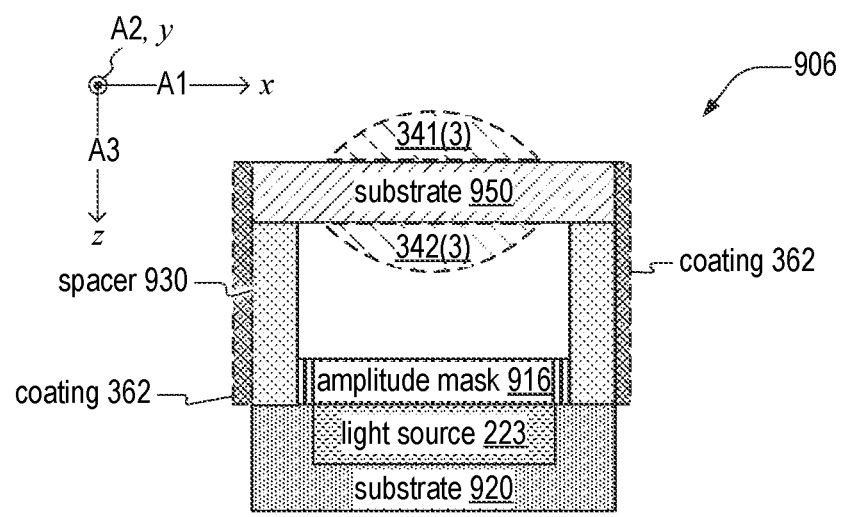
FIG. 9 is a schematic of a projector, which may be part of the self-illuminating camera of either FIG. 2 or FIG. 3, in an embodiment.

FIG. 9 is a schematic of a projector 906, which is an example of projector 206, FIG. 2. Projector 906 is also an example of illuminator 602 that includes an amplitude mask 916, a semiconductor substrate 920, and a substrate 950, which are respective examples of amplitude mask 216, substrate 320, and substrate 350. Projector 906 also includes at least one of lenses 341(3) and 342(3).

Embodiments of self-illuminating camera 300 and self-illuminating camera 600 include projector 906. When self-illuminating camera 600 includes projector 906, self-illuminating camera 600 also includes lenses 341(1-3) and/or lenses 342(1-3), and substrate 650 supports, or is integrally formed with, each of lenses 341(1-3) and/or lenses 342(1-3). In such embodiments, multi-apertured spacer 630 includes an additional aperture that is aligned to light source 223.

Combinations of Features

Features described above as well as those claimed below may be combined in various ways without departing from the scope hereof. The following enumerated examples illustrate some possible, non-limiting combinations:

(A1) A self-illuminating camera includes a camera and an illuminator. The camera includes an image sensor and a first lens of a pair of two identical lenses. The illuminator is adjacent to the camera and includes a light source and a second lens of the pair of two identical lenses. The illuminator has a field of illumination that at least partially overlaps a field of view of the camera.

(A2) In embodiment (A1), the first lens is at a first height above a light-sensing surface of the image sensor, (A3) In either of embodiments (A1) and (A3), respective optical axes of the first lens and the second lens are parallel.

(A4) In any of embodiments (A1)-(A3), a diagonal field of view of the camera exceeds 120 degrees.

(A5) Any of embodiments (A1)-(A4) further include a shutter located at an aperture stop of one of the camera and the illuminator.

(A6) Any of embodiments (A1)-(A5) further include an optical diffuser located between the light source and the second lens.

(A7) In embodiment (A6), the optical diffuser is a batwing diffuser.

(A8) Any of embodiments (A1)-(A7) further include an amplitude mask between the light source and the second lens.

(A9) In embodiment (A8), the light source having a light-emission area that exceeds an area of the amplitude mask.

(A10) Any of embodiments (A1)-(A9) further include a printed circuit board electrically connected to each of the image sensor and the light source.

(A11) Any of embodiments (A1)-(A10) further include a projector adjacent to at least one of the camera and the illuminator. The projector includes an additional light source, a third lens, and an amplitude mask between the additional light source and the third lens. The third lens is identical to each of the first lens and the second lens.

(A12) In embodiment (A11), each of the illuminator and the projector have a field of illumination that at least partially overlaps a field of view of the camera.

(A13) In either of embodiments (A11) and (A12), a center-to-center distance between the first lens and the second lens is equal to a center-to-center distance between the first lens and the third lens, such that respective optical centers of the first lens, the second lens, and the third lens define an equilateral triangle.

(A14) Any of embodiments (A1)-(A13) further include a first transparent substrate including a first lens-supporting region directly above the image sensor; and a second transparent substrate including a second lens-supporting region directly above the light source. The first lens includes a first lens element, of a pair of identical lens elements, on the first lens-supporting region. The second lens includes a second lens element, of the pair of identical lens elements, on the second lens-supporting region.

(A15) In embodiment (A14), the first lens element and the first transparent substrate are monolithic.

(A16) In either of embodiments (A14) and (A15), the first transparent substrate and the second transparent substrate are respective regions of a common transparent substrate.

(A17) In embodiment (A16), the common transparent substrate, the first lens element, and the second lens element are monolithic.

(A18) Any of embodiments (A1)-(A17) further including a first semiconductor substrate, a second semiconductor substrate, a first apertured spacer, and a second annular. The first semiconductor substrate includes the image sensor and a first periphery region that surrounds a pixel array of the image sensor. The second semiconductor substrate includes the light source and a second periphery region that surrounds the light source. The first apertured spacer that spans between the first periphery region and a region of the first transparent substrate surrounding the first lens-supporting region. The second spacer that spans between the second periphery region and a region of the first transparent substrate surrounding the second lens-supporting region.

(A19) Embodiment (A18) further includes, on an exterior surface of the second apertured spacer, one of a reflective coating and an absorptive coating.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated, the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A self-illuminating camera comprising:
   a camera including an image sensor and a first lens of a pair of two identical lenses; and
   an illuminator, adjacent to the camera, and including a light source and a second lens of the pair of two identical lenses;
   the illuminator having a field of illumination that at least partially overlaps a field of view of the camera;
   the first lens being at a first height above a light-sensing surface of the image sensor;
   the second lens being at a second height above a plane that includes the light-sensing surface, a difference between the first height and the second height being less than a depth of focus of the first lens.

2. The self-illuminating camera of claim 1, respective optical axes of the first lens and the second lens being parallel.

3. The self-illuminating camera of claim 1, a diagonal field of view of the camera exceeding 120 degrees.

4. The self-illuminating camera of claim 1, further comprising a shutter located at an aperture stop of one of the camera and the illuminator.

5. The self-illuminating camera of claim 1, further comprising an optical diffuser located between the light source and the second lens.

6. The self-illuminating camera of claim 5, the optical diffuser being a batwing diffuser.

7. The self-illuminating camera of claim 1, further comprising an amplitude mask between the light source and the second lens.

8. The self-illuminating camera of claim 7, the light source having a light-emission area that exceeds an area of the amplitude mask.

9. The self-illuminating camera of claim 1, further comprising a printed circuit board electrically connected to each of the image sensor and the light source.

10. A self-illuminating camera comprising:
    a camera including an image sensor and a first lens of a pair of two identical lenses;
    an illuminator, adjacent to the camera, and including a light source and a second lens of the pair of two identical lenses; and
    a projector, adjacent to at least one of the camera and the illuminator, and including an additional light source, a third lens, and an amplitude mask between the additional light source and the third lens;
    the illuminator having a field of illumination that at least partially overlaps a field of view of the camera;
    the third lens being identical to each of the first lens and the second lens.

11. The self-illuminating camera of claim 10, each of the illuminator and the projector having a field of illumination that at least partially overlaps a field of view of the camera.

12. The self-illuminating camera of claim 10, a center-to-center distance between the first lens and the second lens being equal to a center-to-center distance between the first lens and the third lens, such that respective optical centers of the first lens, the second lens, and the third lens define an equilateral triangle.

13. A self-illuminating camera comprising:
    a camera including an image sensor and a first lens of a pair of two identical lenses;
    an illuminator, adjacent to the camera, that (i) includes a light source and a second lens of the pair of two identical lenses and (ii) has a field of illumination that at least partially overlaps a field of view of the camera;
    a first transparent substrate including a first lens-supporting region directly above the image sensor;
    a second transparent substrate including a second lens-supporting region directly above the light source;
    a first semiconductor substrate that includes the image sensor and a first periphery region that surrounds a pixel array of the image sensor:
    a second semiconductor substrate that includes the light source and a second periphery region that surrounds the light source;
    a first apertured spacer that spans between the first periphery region and a region of the first transparent substrate surrounding the first lens-supporting region; and
    a second apertured spacer that spans between the second periphery region and a region of the first transparent substrate surrounding the second lens-supporting region;
    the first lens including a first lens element, of a pair of identical lens elements, on the first lens-supporting region;
    the second lens including a second lens element, of the pair of identical lens elements, on the second lens-supporting region.

14. The self-illuminating camera of claim 13, the first lens element and the first transparent substrate being monolithic.

15. The self-illuminating camera of claim 13, the first transparent substrate and the second transparent substrate being respective regions of a common transparent substrate.

16. The self-illuminating camera of claim 15, the common transparent substrate, the first lens element, and the second lens element being monolithic.

17. The self-illuminating camera of claim 13, further comprising, on an exterior surface of the second apertured spacer, one of a reflective coating and an absorptive coating.

* * * * *